United States Patent

Neumann et al.

[15] 3,680,069

[45] July 25, 1972

[54] TESTING OF REDUNDANT CONTROL SYSTEMS

[72] Inventors: Dietrich Neumann; George Pattberg, both of Bremen, Germany

[73] Assignee: Vereinigte Flugtechnische Werke-Fakker GmbH, Bremen, Germany

[22] Filed: Sept. 14, 1970

[21] Appl. No.: 71,842

[30] Foreign Application Priority Data

Oct. 17, 1969 Germany.....................P 19 52 349.0

[52] U.S. Cl. ..............................340/214, 340/27 R, 340/411
[51] Int. Cl. ......................................................G08b 29/00
[58] Field of Search........................340/410, 214, 27 R, 411

[56] References Cited

UNITED STATES PATENTS

| | | | |
|---|---|---|---|
| 3,582,926 | 6/1971 | Hassan | 340/214 |
| 3,603,948 | 9/1971 | Medlinski | 340/214 |
| 3,505,641 | 4/1970 | Boskovich | 340/27 |
| 3,508,232 | 4/1970 | Williams et al. | 340/214 |
| 3,521,229 | 7/1970 | Lepers et al. | 340/27 |

Primary Examiner—David L. Trafton
Attorney—Smyth, Roston and Pavitt and Ralf H. Siegemund

[57] ABSTRACT

Testing equipment for aircraft, redundant control systems provides preliminary test of the testing equipment, then tests operativeness of the monitor which detects normally parallel operation of these systems and, finally, parallel operation of the control circuits is tested with the aid of the monitor.

20 Claims, 3 Drawing Figures

TESTING OF REDUNDANT CONTROL SYSTEMS

REFERENCE TO COPENDING APPLICATION

This invention relates to the disclosure of Application Ser. No. 64,750, filed Aug. 18, 1970.

The present invention relates to a method, device and apparatus for testing the components of a redundant control system having at least three parallel operating branches and including a monitor for supervising the individual control circuit branches; in case one of the branches becomes defective it is disconnected.

In automatic control systems it is more and more customary to employ redundant systems wherein several, parallely operating, similarly constructed circuit branches operate the same device (actuator) to be controlled. Such control systems are particularly used for the control of aircrafts because it is apparent that a drop-out of *a* control circuit must not endanger safety of overall operation. In order to obtain a high degree of reliability the particular control circuit is duplicated or triplicated, and the various similar circuits operate in parallel as independent branches of a system.

The individual control circuits are now being monitored continuously, and it is necessary to remove a defective circuit from the system by disconnection before an error can propagate into the system as a whole. To benefit fully from the redundancy provision, the system should be fully operative in the beginning of operation. A high degree of reliability is obtainable here only if all members and branches of a redundant system are tested as to operatebility prior to operation proper.

Manual type testing of a redundant control system is quite impractical because the number of tests to be conducted is very high so that a test would take too long. This is particularly true as some of the tests are rather complicated. Also, it is apparent that a "manual" test is only as good as the person conducting that test is reliable. Thus, a high degree of competence and reliability of the operator conducting the tests is mandatory, and human error must not creep into the system. It is, therefore, desirable, to have such a test conducted automatically, to avoid human error and to reduce time for testing to a reasonable minimum.

For testing operability of devices in general it is known to simulate inputs as they may occur during regular operation, and to apply such inputs to the several components and to compare the resulting reactions with reference values, suitably stored and withdrawn for the purpose of making such comparisons. In case the reactions deviate from the reference values by an amount that exceeds predetermined tolerances, the particular component is regarded as defective. Such a test, if extending over the entire redundant system, would not detect errors of individual branches, because during operation the monitor itself has to be on line as part of the system, and if the monitor operates correctly, it properly disconnects that defective branch circuit so that the system as a whole continues to operate as desired, while the defect escapes detection.

In order to avoid this possibility, it is seemingly necessary to test each branch individually. However, that may require separation of the particular branch circuit from the system for the test so that it has to be reconnected afterwards. This procedure is generally regarded as an undesired intrusion into the system. First of all, whether or not the reconnection is made properly requires additional tests. Moreover, such a disconnection for each test (conducted prior to each operation), is basically undesirable as particularly there is a progressing, long term probability of error and reduction in safety which is quite undesirable for flight control systems. Also, any test that requires disconnection for the test, and subsequent reconnection followed by a test of the reconnection, extends overall test time and is costly.

The invention avoids the disadvantages outlined above and concerns itself particularly with the testing of a triple-control system, or of a system of a still higher degree of redundancy. In accordance with the preferred embodiment of the invention, it is suggested to test the monitor first, and, having it found operative, the individual circuits are tested indirectly, using the monitor in such a manner that their operability can be deduced from response of the monitor.

The invention is based on the principle that once the monitor was found operative, it may be included with advantage in further tests on the multiple redundant control system, obviating the need for testing the individual components. Operability of the monitor can be tested in a simple manner in that test signals are applied to its input which in accordance with the first test do not (or should not!) cause the monitor to respond. In a second step the test signals differ so that the monitor, if operating properly, will respond. The response of the monitor to these tests is a representation of the operability of the monitor. The test signals may be fed to the monitor directly or via the respective control circuit branches as they are monitored by the monitor. In the latter case, a summary type of test of the control circuits is included, but this does not change the principle of the invention. Should that test, intended for testing the monitor, lead to an error because of a faulty control circuit, the test can be terminated anyway as the on-line test conducted in accordance with the invention is not intended for a detailed diagnostics, rather operational fitness of the aircraft prior to immediate use is to be tested to determine a need for an exchange in components. On the other hand, if that test indicates proper operation, the monitor does operate properly as offsetting of errors is extremely unlikely as it will be seen.

After the monitor was found operative, test signals are applied to the control circuits, covering the entire control range. These test signals may be produced indirectly by artificial controlled stimulation of transducers that provide the inputs for the control circuits. Each circuit must behave in accordance with its predetermined characteristics. However, it is extremely unlikely that all of these independently operating control circuits exhibit parallely running equally faulty behavior. Thus, it is necessary only to determine whether or not their outputs remain similar for similar inputs. In other words, the control circuits serve mutually as reference, obviating the need for a special function generator as reference. The detection of similarity of these outputs is the normal function of the monitor. Having found the monitor operative in the previous test, the monitor now tests the similarity of outputs for simulated input signals.

The monitor is constructed to combine the outputs of respective two control circuits in a duplex systems to serve as reference for testing the output of the third circuit. It is correct to assume that two systems together have a higher degree of reliability than the individual third one that is being tested, particularly if that combination if repeated for each other circuits.

In accordance with another feature of the invention, the test system is itself tested prior to the principle test program. This test involves primarily an investigation that the test circuit is in fact capable of indicating errors. The preliminary test is conducted by running through the principle test program at an excessive rate, above the response limit of the components and circuits tested, so that each test should lead to an error indication. The preliminary test, thus, interrogates the system for each test to lead to an error. The number of "errors" are counted and should equal the number of tests conducted. If so, the test equipment can be regarded as operative with a high degree of certainty.

Thus, the overall system and method operates in a staggered sequence. First, the testing equipment is itself tested. Next, the monitor is tested, and finally, the branch circuits are tested with the aid of the monitor.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
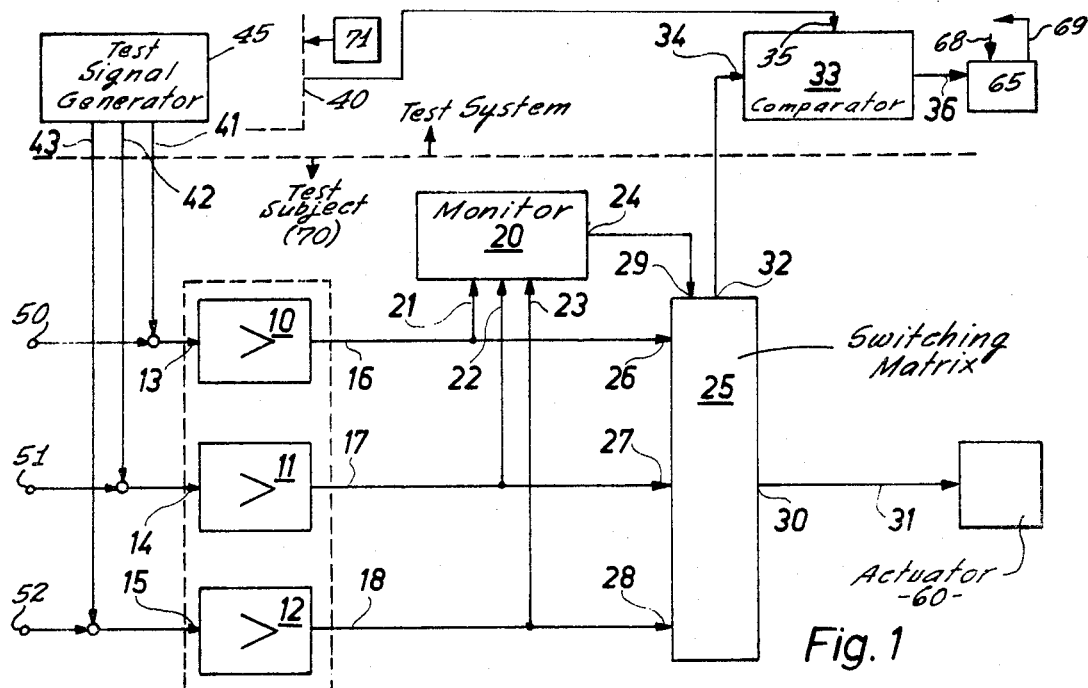
FIG. 1 illustrates schematically a block diagram of a circuit for testing operativeness of a monitor, which normally controls connection of operative and disconnection of defective control circuits in a redundancy system.

Proceeding now to the detailed description of the drawings, in FIG. 1 is illustrated a control system that includes three control circuits 10, 11 and 12 as parallely but independently operating branches. Each of these control circuits has an input, respectively, 13, 14 and 15, which receive respectively input signals from appropriate, similarly constructed transducers 50, 51, 52. The redundancy principle has, thus, been extended to require separate transducers for each control circuit. Also, each control circuit may include its own reference source for normal operation.

Each control circuit has an output, there being output terminals 16, 17 and 18, respectively, and they are connected respectively to three inputs 21, 22 and 23 of a monitor 20. Additionally, there is provided a connect-disconnect circuit network 25, or switching matrix, having inputs 26, 27 and 28, respectively connected to the outputs 16, 17 and 18 of the three control circuits.

The monitor has a switch control output channel 24 connected to a fourth input 29 of disconnect circuit 25. The link between monitor 20 and switching matrix 25 is shown as a single line in representation of a monitor output channel, that may include plural, parallely operating control lines for operation of the switching matrix 25. The connect-disconnect circuit or switching matrix 25 may include signal summing circuitry that sums and averages the inputs that are operatively connected in any instant. The switching matrix and signal summation may be constructed as shown in companion application of common assignee Ser. No. 64,750, filed Aug. 18, 1970,. Connect-disconnect circuit 25 has output terminal 30 that connects to a line 31, which, in turn, is connected to an actuator 60. Operation of that actuator is function and purpose of the control system.

Connect-disconnect circuit 25 provides switching state that normally connects the three control circuits 10, 11 and 12 to actuator 60 for operation thereof. Monitor 20 detects whether or not one or more of the control circuits 10, 11 and 12 (there may be more) operate properly. If not, monitor 20 signals to the switching matrix to disconnect the defective one. The monitor can be constructed in a variety of configurations. For example, a reference is established by combining the three inputs in a manner that two similar inputs prevail (majority principle) in the combination output. The three inputs are individually compared with that combination output as reference to ascertain which one, if any, of the three monitor inputs differs. Another way is to combine respective two inputs to form average and difference; the average is used as reference with the respective third input. The third input is regarded as an incorrect input only if the difference of the two other inputs is zero or below threshold. It can readily be seen, that different techniques can be employed to sort out one erroneous monitor input from the remaining inputs, as within a sufficiently short time span a deviating control circuit can properly be regarded as erroneous, by the mere fact that it operates differently (higher or lower output) from the others. A suitable monitor is, for example, disclosed in German Pat. No. 1,277,677 see also British Pat. No. 1,074,703.

The system as described thus far is a redundancy control system, whose operational state is to be tested prior to operation. The first, principle type of test to be described involved the monitor itself. The disconnect circuit 25 has another output channel 32 which provides signals that represent the switching state of the disconnect circuit 25. This output is also shown as single line, in representation of an output channel, that may also include plural parallel lines. For example, channel 32 may provide a two bit code in representation of the four different switching states: All control circuits on line; 10 off, 11 and 12 on; 11 off, 10 and 12 on; 12 off, 10 and 11 on. Alternatively, the switching state may be represented by a four level analog signal.

Signals representing the switching state of matrix 25 are fed to one input side 34 of a comparator 33, having another input channel 35 which receives reference signals from a test program controller 40. The reference signals represent the desired switching state of matrix 25, for example, in a similar, two bit code or as appropriate analog signal. The controller 40 is itself under control of digital control unit 71 which steps and sequences the program controller 40 through the test program. Unit 71 may have the character of a program counter.

An output of the comparator 33 can be taken from a line 36, indicating agreement or disagreement between desired and actual switching states. That output controls an indicating recording or otherwise signalling device 65, having particular response in case of error. Device 65 has a strobing input 68 that allows normally for signal settling and switching response before recognizing the output signal of comparator 33 as being representative of agreement or disagreement. An output line 69 signals whether or not an error has been detected. If not, the test program continues; if so, an external indicator may be turned on, and the test sequence is halted; the state of sequence 71 at the time of a halt is of diagnostic value.

The test program controller 40 includes a test signal generator 45 which has three outputs, 41, 42 and 43. There are respectively connected to the inputs 13, 14 and 15 of the three control circuits, there being summing points interposed for combining the test signals with the normal transducer output signals. During testing, the transducer signals are zero as the aircraft does not yet operate. Thus, during testing, circuits 10, 11 and 12 are in effect under control of signal generator 45. On the other hand, during operation, the programmer 40 is operatively disconnected and the output terminals of generator 45 are floating.

The monitor 20 is tested in the following manner. The test program controller 40 causes generator 45 to provide particular signals in representation and as simulation of inputs. Additionally, controller 40 causes generator 45 to vary the signal between two different levels as they are applied to respective two of the three control circuits. However, during this first test step the level difference has value so that the respective differences in outputs of circuits 10, 11, 12 remain below the response threshold of monitor 20. Thus, monitor 20 is not supposed to respond to this first test step. The first step is actually comprised of three substeps for pairing respective two out of the three control circuit inputs. During each substep monitor 20 must not operate disconnect circuit 25, none of the three control circuits 10, 11 and 12 must be disconnected.

Nonresponse of the monitor 20 is represented by circuit 25 maintaining of the full connect switching state for all three control circuits. That switching state is represented by particular signals taken from output 32 and applied to input 34 of the evaluating device 33. Concurrently with the test signals in lines 41, 42 and 43, program controller 40 provides a reference signal to input 35 that represents the fully connect state. Thus, for this particular test step device 33 compares the actual switching state representing output signal of connect-disconnect circuit 25 with the concurrently provided reference signal representing the full-connect state. In case of deviation indication is had accordingly in and by device 65.

As was mentioned above, in case an error is being detected, the test is terminated although it is conceivable to have the test program completed to detect all errors and to record same. However, for a pre-operation, service test the detection of a single error may suffice, the test is terminated and the faulty units are removed, i.e. replaced. The state of test program sequencer 71 by the time of halting may indicate with sufficient particularity which unit has to be removed.

In case there is no error, the nonerror situation as signalled in line 69 may be used for stepping the test program controller to conduct the next test step. For this second signals test within the sequence presently considered, again simulated inputs are applied to terminals 13, 14 and 15 by means of generator 45. However, now there is a significant difference in signal levels as provided by generator 45 for one input as compared with the inputs for the respective two others of the three control circuits 10, 11, 12. In particular, that difference in level is provided so that the resulting outputs of the control circuits differ to exceed the monitor threshold. This second test may include a sequence of three subtests; in a first one the signal in line 41 differs from the two other signals by an appropriate amount; in the next test the signal in line 42 and in the third the signal in line 43 differs.

In case of correct operation, monitor 20 is to provide three different switching signals to matrix 25 causing disconnection of the respective "faulty" control circuit. The three subtests are accompanied by three different reference signals applied by controller 40 to input 35 of comparator 33. If, in fact, proper disconnection is produced in each case, the correct switching state representing signals are derived from circuit 25 and applied to comparator 33. A deviation from the reference that is current in each instant indicates also here that the switching and disconnect operation was not conducted satisfactorily by the monitor and an operational error is indicated. Otherwise the test program proceeds.

It should be mentioned that the relation between monitor 20 and disconnect circuit 25 is not necessarily self-restoring, in that during normal operation a control circuit, once removed from line 31, remains disconnected regardless of further development of signal in the control circuit after that disconnection. For testing, however, the program controller 40 should provide restoration of full connection by circuit 25 after each successful test. If, however, the relation between circuits 20 and 25 is self-restoring, the full connect state after each successful test can be restored simply by equalizing again the test signals as applied by generator 45 to the inputs of the three control circuits.

One can see that in these particular tests response of monitor 20 as well as of the individual circuit branches 10, 11 and 12 are tested summarily, but as to the latter circuits, only a complete dropout of one of them will be recognized as an operational differential for the particular, but arbitrarily chosen, test signal level. In case an error is detected, the defect may involve either of the control circuits 10, 11 or 12 or the monitor 20, so that the error may not necessarily be localized. However, further localization is not necessary; it has become increasingly customary, particularly in the aircraft industry, to exchange complete modules in case of error so that it is only necessary to test whether or not a module as a whole operates satisfactorily. Once an error has been detected in the module, the module is replaced by another one, and further localization of the source of error within the module is not needed for the particular procedure envisioned here, concerning basically the readying of an aircraft for immediate service.

Another point to be considered is the following. It is conceivable that both, monitor and one or more of the control circuits, happen to have defects with compensate. For example, in the first test sequence the outputs of the control circuits may widely differ even though they should not differ to cause the monitor to respond, the monitor, in turn, may be defective and not recognize that difference, thus maintaining a full connect state for circuit 25 as intended, but now only by balance of error. Clearly, then in one of the subsequent subtests, when the outputs are caused intentionally to differ, the defect will show up.

It should be mentioned that actually the monitor could be tested directly by causing the control signals from unit 40 to be applied directly to the monitor 20. This, however, would require disconnection of the monitor from the system as monitors are usually not referenced to ground. However, if they are, signal summing points could be interposed between control circuit outputs and monitor inputs to receive the test signals as alternative inputs for the monitor.

Figure 2:
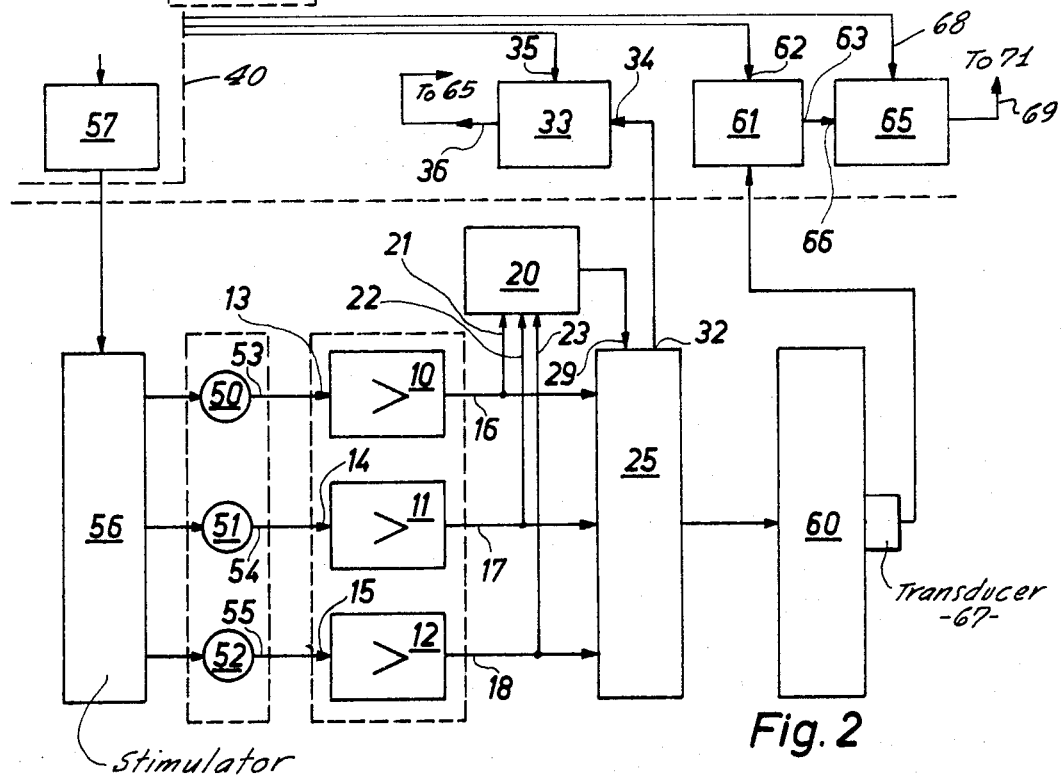
FIG. 2 illustrates a block diagram of a testing device for testing the individual control circuits, the test conducted on basis of a successful test of the monitor.

In case one of the tests is conducted in the manner aforedescribed and did not result in any error, parallel operation of the control circuits 10, 11 and 12 is tested next, particularly as to the control range expected to be covered during normal operation. This is illustrated in FIG. 2. As stated above, this (third) test sequence does test on the desired characteristical response of the three control circuits to inputs varying in unison over the range of inputs to be expected during normal operation. The test is now predicated on the assumption that it is extremely unlikely that, for example, input-output characteristics of all three circuits, 10, 11, 12, are similarly distorted. Thus, they are used mutally as reference, and the monitor is used to detect mere differences in outputs, regardless of the absolute values thereof.

For this, a stimulator or deflecting mechanism 56 is provided for acting on the transducers 50, 51 and 52. Transducer deflection and stimulating mechanism 56 is under control of a circuit unit 57 which is another signal generator of and in test program controller 40. During the test as conducted, also here under control of sequencer 71, signal generator 57 provides control signals that energize stimulator 56 which, in turn, operates on the transducer to simulate particular measuring conditions.

Additionally, the reaction of actuator 60 is to be supervised, for example, by means of a transducer 67, providing signals which represent actuator operation (e.g. position). The output signal of transducer 66 is passed to a comparator 61 as a first input thereof. A second input 62 for the comparator could be a steady signal but is preferably a sequence of distinct reference values provided by test program controller 40, concurrently with the providing of signals by generator 57 (and associated therewith through the test program). These reference values on input 62 represent the required response by actuator 60 to particular inputs for the control systems 10, 11 and 12, as provided by stimulation of the transducers 50, 51, 52.

Comparator 61 provides an output into an output line 63 which output represents the result of the test and that result is set into a particular portion of evaluating device 65 which interrogates the comparator. The interrogation here may be had on a continuous basis, but, preferably, interrogation is carried out in response to distinct timing and strobing signals. In case the comparator detects a deviation as between actual tested signal value and programmed reference value an error indication is made, and the test program is halted as before.

In summary as to FIG. 2, the parallel-operation test is conducted in the following manner. Transducers 50, 51 and 52 are artificially stimulated by means of device 56; the degree of stimulation being controlled by the unit 57 whose operation, in turn, is part of the operation of the test program controller. The particular stimulation, as provided, is similar for all of the transducers 50, 51 and 52, so that (supposedly) similar signals are applied by the transducers to the inputs of the three control circuits 10, 11 and 12. It should be noted that monitor 20 is presumed to have been found operative. Thus, the monitor will respond in case each set of similar inputs for the three control circuits results in differing responses and outputs. The transducers are now stimulated by inputs varying over a particular range. If the control circuits 10, 11, 12, operate without error, they should provide similar outputs, though the outputs, of course, vary over the required range.

During this sequence of stimulation, monitor 20 supervises the operation of the circuits 10, 11 and 12, and switching matrix 25 should remain in the full connect state for receiving the outputs of all three control circuits. Comparator 33 participates also in this test phase. It receives from the program controller reference signal representative of the full connect state. In case of error, comparator 33 responds and triggers error indicator 65 as before.

Concurrently to testing parallel operation of circuits 10, 11, 12, the reaction of the actuator 60 to the combined output is determined separately, through transducer 67 and comparator 61. The stimulation of the transducers 50, 51, 52, as inputs of the control circuits, is presumed to cover a range of outputs as taken from line 31 for actuator 60 to be deflected from a minimum threshold response up to but not exceeding maximum or upper position limit. In case the reaction by the actuator 60 deviates from the programmed response, an error is indicated by the device 65 and again the test is interrupted and, possibly, discontinued.

The transducers 50, 51 and 52 may be mechanically deflected as to their respective inputs or there are feeler members etc. The transducer response may be subject to certain time delay and transient operation. Thus, the rate of attack as to a particular deflection can be chosen that the frequency independent components and the frequency dependent components of the individual control circuits will provide similar signal components as contributing to the output signals, and as combined and fed to actuator 60. This choice of particular temporal behavior of the stimulation avoids that in the case of an error within a certain part of the control circuit such error is "covered" by over-response in a different component of the particular circuit (which may cause the monitor 20 not to respond though it should). However, if the temporal characteristics of transducer stimulation is chosen as outlined, monitor 20 will respond in case of defect and that, in turn, causes disconnect circuit 25 to disconnect the faulty circuit.

This parallel operation test, of course, points also to the particular faulty control circuit as the resulting switching state should identify the defective control circuit. This can be pinpointed automatically in that once an error is discovered, the program unit 40 may provide a sequence of reference signals to input 35 of comparator 33 to interrogate the switching state circuit 25 has assumed. That, in turn, points to the defective control circuit that has been disconnected by the monitor.

The possibility exists that the testing device and circuit itself does not operate properly and is defective. Such defect could "hide" a defect in the control and actuator system to be tested. Most critical, of course, is that the testing equipment as a whole is capable of indicating errors! Therefore, prior to each test and more particularly prior to each test sequence of the type outlined above, there must be a particular preliminary test in which the testing circuit tests itself.

Figure 3:
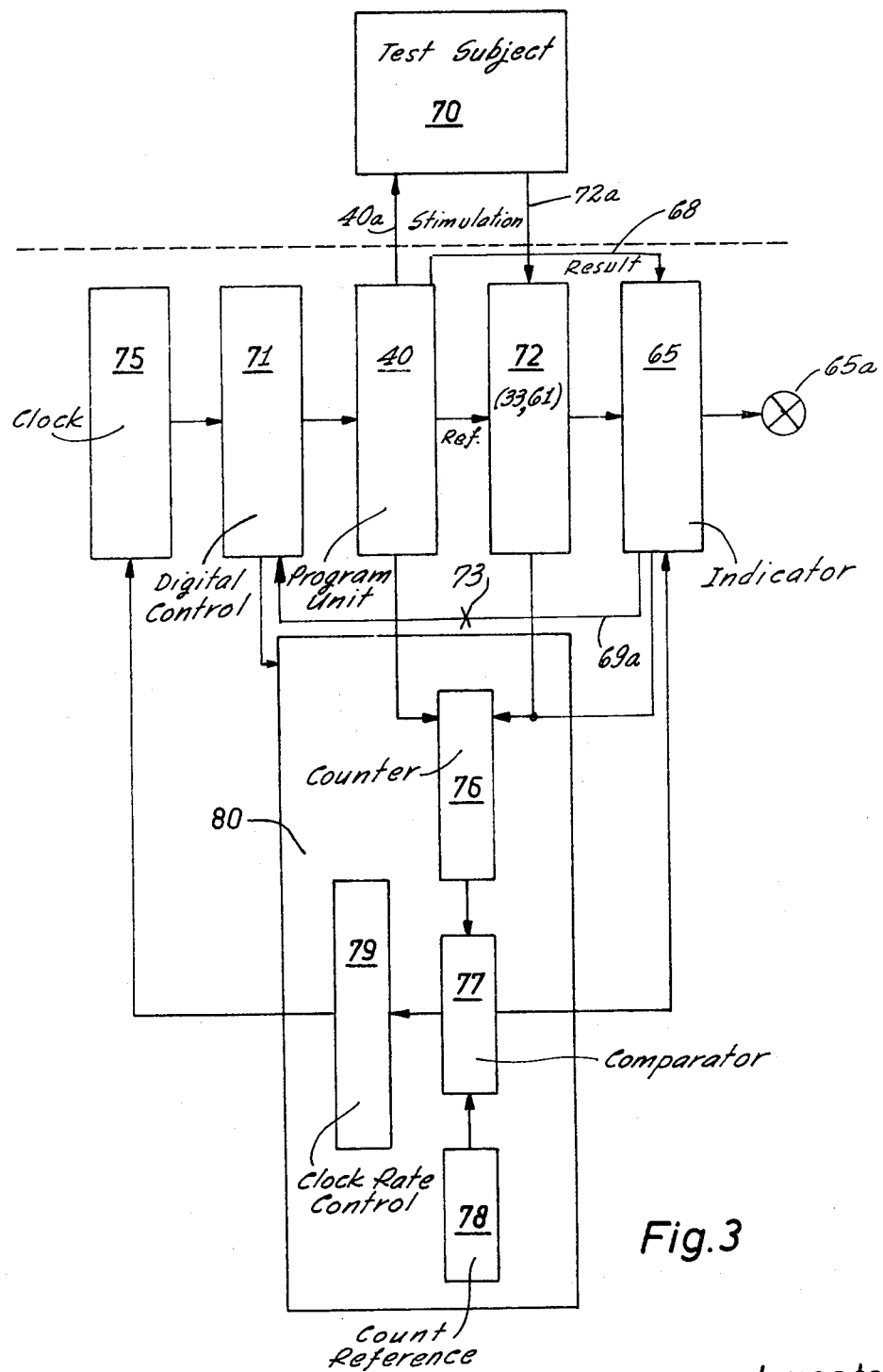
FIG. 3 is a block diagram for auto-testing of the testing arrangement, the test to be conducted as a preliminary step prior to tests in accordance with FIGS. 1 and 2.

FIG. 3 illustrates the block diagram for such "auto"-testing. The circuit includes an overall diagram of the test circuit and system as described thus far. Reference numeral 70 denotes generally the redundant control system that is the "test subject". That subject includes circuits 10, also 12, actuator 60 and, possibly, numerous others. It also includes the monitor and others.

The test subject 70 is connected to program controller 40 as denoted generally by 40a, but the connection includes all of plural lines such as 41, 42, 43, 58, as outlined above. Line 72a denotes generally the connection between "test subject" and error detectors 72. These detectors 72 include collectively the comparators 33, 61 and others.

The test program controller 40 is controlled by digital control unit and program sequencer 71, which, in turn, is connected to and operated by a clocking device 75. The clocking device 75 determines the rate of progression of the test sequences, i.e., the rate of changing test signals etc. Additionally, digital program sequencer 71 is controlled by indicator 65 (line 69a) in response to the outcome of tests as to whether or not the test sequence is to be halted or continued. The connection 69a includes control for signalling device 65a, signalling error and halting of testing.

In addition, there is now provided a self-testing unit 80. A switching unit 79 thereof is connected to clock 75 to change the clock rate. Unit 80, further, includes an error counter 76, coupled to indicator 65 to count each error state as signalled by the indicator 65. The counter 76 is operated in synchronism with the tests as conducted, which is symbolically denoted by a connection between program unit 40 and counter 76. Thus, counter 76 counts the number of errors found.

During this self test phase, the link 69 between error indicator 65 and test program sequencer 71 is interrupted as symbolically denoted at 73, as an error indication during the phase should not halt the test program. A similar interruption is present as between indicator 65 and the external signalling device 65a.

The output of counter 76 is connected to one input of a comparator 77, having a second input provided by a source 78 of reference signals. Source 78 provides a reference value (analog or digital) that represents a particular number of errors or detected defects. Upon agreement of counter state and reference, comparator 77 so signals to indicator 65 separately, receiving that alternative input only during the pre-test phase.

Each test proper, as outlined representatively with reference to FIGS. 1 and 2, is preceded by an automatic self-test as stated in which all errors which the test unit as a whole is to recognize are simulated and counted. Particularly, the program unit 40 runs through all of the contemplated tests on subject 70, but at a speed which is considerably higher than the test speed for normal operations. The speed increase may involve a factor of 1,000 or may even be higher.

Now, it is to consider that the test subject 70, when attempting to respond to the test, will not be able to follow at such an increased speed, so that in case the test equipment operates normally, it will find an error for each and every test it is to conduct. Provided, of course, it does conduct the test. As schematically indicated by line 68, the clocking of indicator 65 during each test phase, at the end thereof, now occurs too early for any of the comparators to have responded to equal inputs.

All of the "errors," thusly detected, on and in subject 70 are counted in counter 76 and it will be appreciated that in case each test leads to an error, which all tests are supposed to, the number to be reached in counter 76 at the end of this enhanced speed test sequence must be equal to the number of tests conducted. Accordingly, the reference signal from source 78 simply represents, in proper format, the number of different tests conducted.

At the end of the auto-test, comparator 77 compares the state of error counter 76 with the number of tests conducted and the result is fed the indicator 65. If the number are dissimilar, error is indicated, i.e., the test unit itself was found faulty and has to be replaced. For this, the interrupted connection to signalling device 65a is bypassed. If the comparator 77 finds the number of errors equal to the number of tests conducted, a trigger signal for clock rate control 79 may be provided to change the clock, and now the tests will be conducted at the regular rate. Also, connection 73 and the connection to signalling device 65a are being closed.

It can be seen that this kind of self-testing actually involves practically all components of the testing unit and has, therefor, a high degree of reliability. In addition, of course, this self-testing takes only a very short period of time due to the increase in speed. It should also be mentioned that all tests as conducted during the preliminary test phase at the high rate do not depend on the temporal characteristic of the individual circuits to be tested. On the contrary, the enhenced speed has been chosen to be faster than any responses of any of the units in subject 70, so that, in fact, each test results in an error indication!

The self-testing unit can be constructed from known digital modules and units. Due to compact circuit designs and packaging (IC's etc.) as used today, the entire test equipment occupies very little space. This includes also many of the elements such as the comparators which operational amplifiers etc. may operate on very low power, just sufficient to provide any indication that is necessary. Thus, the equipment as described can be made part of the permanent equipment of an aircraft, to stay on board, and to be provided in form of plug-in type units to permit ready exchange in case one of the other of the components was found to be defective.

The invention is not limited to the embodiments described above but all changes and modifications thereof not constituting departures from the spirit and scope of the invention are intended to be included.

I claim:

1. Method of testing redundant control circuit systems, wherein a plurality of control circuits operate in parallel and are supervised by a monitor, the monitor disconnecting defective control circuits from the system during normal operation, comprising the steps of:
   a. testing the monitor as to its response capability to distinguish between similar and dissimilar outputs of the control circuits;
   b. providing representation of the state of the monitor;
   c. providing subsequently simulated, similar inputs to the control circuits, varying in unison over a particular range; and
   d. using the monitor to test persistence of similarity of outputs of the control circuits as the similar inputs vary over the particular range.

2. Method as in claim 1, the monitor test comprising, first applying control signals to the monitor in representation of different outputs of the control circuit, differing by a value below the threshold of monitor response; second, applying corresponding control signals to the monitor differing by a value in excess of the monitor threshold.

3. Method as in claim 2, the monitor test including applying control signals to the inputs of the control circuits, the first and second control signals developed by the control circuits themselves in response thereto to be effective in the monitor.

4. Method as in claim 2, the control signals being applied to the monitor directly in lieu of outputs of the control circuits.

5. Method as in claim 1, the simulated inputs provided through stimulation of transducers connected to the inputs of the control circuits.

6. Method as in claim 1, the test including testing the reaction of an actuator controlled by the plurality of circuits as operating in parallel.

7. Method as in claim 1, preceded by a test in which the test sequence of the steps (a) through (d) is run through at a high speed for each test to lead to an error indications; counting the number of error indications and correlating the number with the total number of tests conducted.

8. Method as in claim 1, the connect state of the outputs of the control circuits being represented by switch state signals, the monitor test including, comparing the switch state signals with reference signals representing the desired switch state for input test signals applied to the monitor.

9. Method as in claim 1, including the step of stopping the test sequence upon detection of defect.

10. Method for testing the principle components of a redundancy control system having at least three parallely operating control circuits, the system further including a monitor and a switching circuit, the monitor for responding to incorrect operation of and defective control circuits, to control disconnection thereof by means of the switching circuit, comprising:
   simulating operational signals of the control circuits in representation of different operational states, including first signals controlled for representing differing control circuit outputs, and second signals controlled for representing similar control circuit outputs; and
   providing indication of monitor response to the different operational signals.

11. A circuit for testing the principle components of a redundancy control system, having at least three parallely operating control circuits, the system further including a monitor and a switching circuit, the monitor for responding to incorrect operation of and defective control circuits, to control disconnection thereof by means of the switching circuit, comprising:
   means connected for simulating operational signals of the control circuits in representation of different operational states, including first signals controlled for representing differing control circuit outputs, and second controlled for representing similar control circuit outputs; and
   means connected to provide indication of monitor response to the different operational signals.

12. A circuit as in claim 11, the first signals applied to the inputs of the control circuit, the circuit including program means to cause first signals as applied to respective two control circuits to differ by particular amounts.

13. A circuit as in claim 12, additional first signals being provided by the program means to differ to the extent that the resulting outputs differ by value less than the response of the monitor.

14. A circuit as in claim 11, there being transducers connected to provide regular inputs for the control circuits, the test device including means for activating the transducers under control of the program means, to obtain the second signals.

15. A circuit as in claim 11, there being means to provide representation of the state of the switching circuit, the program means providing representation of the desired state of the switching circuit commensurate with the correct response by the monitor to the operational signals, there being means connected to provide indication of any difference in the two representations.

16. A circuit as in claim 11, including program means for conducting a sequence of tests by providing a particular sequence of test signals, there being means to cause the test signals to operate the control circuits.

17. A circuit as in claim 11, including a control signal generator having plural outputs respectively coupled to the control circuits, to obtain simulated operational signals for zero input as provided by transducers to the inputs of the control circuit so as to test operativeness of the monitor.

18. A circuit for cooperation with a redundancy flight control system, having at least three parallely operating control circuits, a monitor connected to the control circuits for supervising operation thereof, and a disconnect and switching system to disconnect defective control circuits, comprising:
   a first test signal generator connected to simulate monitor inputs for testing response of the monitor as to control of disconnect operation of the disconnect system;
   a second test signal generator connected to cause the control circuits to respond respectively to inputs varying over a particular range;
   means connected to detect response of the monitor to any dissimilarity in outputs of the control circuits as said inputs vary over the particular range; and
   program means connected to sequentially operate the first and second test signal generators.

19. A circuit as in claim 18, the first signal generator coupled to the control circuits and providing first signals in response to which the monitor is not to respond, and second signal in response to which the monitor is to respond to operate the disconnect system; the program means providing a sequence of reference signals that represent the correct state of the disconnect system.

20. A circuit as in claim 18, including means for testing actuating means operated by the parallely operating control circuits.

* * * * *